Aug. 19, 1958 R. GÖRIKE 2,848,561

DYNAMIC MICROPHONE

Filed Dec. 8, 1953 4 Sheets-Sheet 1

Inventor
RUDOLF GÖRIKE

By [signature]
Attorney

Inventor
RUDOLF GÖRIKE

By [signature]
Attorney

DYNAMIC MICROPHONE

Filed Dec. 8, 1953 4 Sheets-Sheet 3

Inventor
RUDOLF GÖRIKE

By [signature]
Attorney

Aug. 19, 1958 R. GÖRIKE 2,848,561

DYNAMIC MICROPHONE

Filed Dec. 8, 1953 4 Sheets-Sheet 4

INVENTOR.
RUDOLF GÖRIKE

BY [signature]
Attorney

United States Patent Office 2,848,561

Patented Aug. 19, 1958

2,848,561

DYNAMIC MICROPHONE

Rudolf Görike, Vienna, Austria, assignor to Akustische u. Kino-Gerate Gesellschaft m. b. H., Vienna, Austria Application December 8, 1953, Serial No. 396,827

Claims priority, application Austria June 2, 1953

10 Claims. (Cl. 179—115.5)

The present invention relates to a dynamic microphone for preferred sound response in one direction, particularly of cardioid directional characteristics, more particularly is directed to such a microphone having only a single electric conductor, by whose movement in a magnetic field an E. M. F. is produced. The electric conductor may consist of the moving coil, which is connected with the sound responsive member or diaphragm, or the sound responsive member may consist itself of electrically conducting material and be arranged in a magnetic field.

In sound conversion engineering, microphones for preferred sound response in one direction, e. g. for a cardioid directional characteristic, have gained great importance. Numerous constructions of that type have been disclosed but previously they have not satisfied high requirements for transmission performance.

In a known arrangement, a pressure microphone with nondirectional characteristic, e. g. a moving-coil microphone, has been arranged beside a pressure gradient microphone with bidirectional characteristic, e. g. a ribbon microphone, and both microphones have been electrically interconnected. To remove the resulting phase differences of the spatially separated microphones, another known arrangement provides in a single moving-coil microphone, both the pressure microphone and the pressure gradient microphone combined in such a way that the single diaphragm is directly exposed to the sonic field at its front, and is exposed to the sonic field with its back through an acoustic frictional resistance.

The natural frequency of the single diaphragm in such known arrangement was about 60 C./S. so that its susceptibility to impact and wind was felt as even a greater disturbance than in the ribbon microphone. On the other hand, the natural frequency of the pressure gradient microphone had to be placed at the lower limit of the transmission range because the pressure gradient increases linearly with increasing frequency and must be offset by a corresponding restraint of the diaphragm (mass restraint) to obtain an E. M. F. independent of the frequency. Since it was not possible to provide a diaphragm provided with a moving coil, with a rim so flexible that its natural frequency was at the lower limiting frequency of the transmission range, the cambered cap of the diaphragm with moving coil was mounted in a very flexible double gland to obtain a natural frequency of 60 C./S.

In another known construction two symmetrical systems were coupled through an air plug, which had the function of increasing the effective mass of the diaphragm and, moreover, of interconnecting the rear sides of the diaphragms. That arrangement has the drawback of requiring many elements of construction for two symmetrical systems, and of very great variations in sensitivity in dependence on the frequency in the upper transmission range, the frequency response curve exhibiting marked peaks and dents.

The inventor has recognized that these irregularities in the sensitivity in dependence on the frequency of the upper transmission range are caused by standing waves formed in the air plug, which is so favorable in other respects, every time, when in accordance with the whistle theory, a quarter or half wavelength of the respective sound frequency equals the length of the air plug or an integral fraction thereof.

Accordingly, it is an object of the present invention to provide a microphone which operates on the moving coil principle and in a transmission range of 30–16,000 C./S. and moreover exhibits a frequency-independent directional characteristic, high efficiency, and preferably unilateral directional characteristic, e. g. of cardioid or the like type, and which is practically insusceptible to impact and wind. According to the invention, the above object is achieved by providing a microphone in which the diaphragm resonance related to the restoring force of the resilient diaphragm rim is higher than the lower limiting frequency and the acoustic impedance influenced by the rear acoustic field is formed by at least one air plug the length of which is smaller than half the wavelength, and preferably equal to a quarter wavelength of the highest transmission frequency to be utilized, said air plug being enclosed with relatively little friction by a duct which is preferably of round cross section and in which the mass of the air plug, or the total mass of the air plugs, where more than one air plug is employed, effective at the diaphragm together with the mass of the diaphragm and the restoring force of the resilient diaphragm rim provide resonance at the lower limit of the transmission range, while the acoustic impedances ensuring the frequency-independent conversion of the pressure component and coupled with the diaphragm impedance form attenuated acoustic resonant circuits, the resonant frequencies of which are distributed over the transmission range being utilized.

Further features of the invention relate to the dimensions of such air plug or plugs, the adjustment of their cross-sectional area, the dimensioning of additional acoustic impedances so that resonance points are distributed throughout the transmission range, the manner in which adjustability of the frictional resistance of such resonant circuits is achieved, the arrangement of a second diaphragm and of a moving coil thereon, the electric connection of the moving coils of both diaphragms with electric control means interposed therein, and further the arrangement of permanent magnets in the microphone casing.

Illustrative embodiments of the invention are hereinafter described in detail with reference to the accompanying drawings, in which Fig. 1 is a longitudinal sectional view of a microphone embodying the invention.

Figure 1:
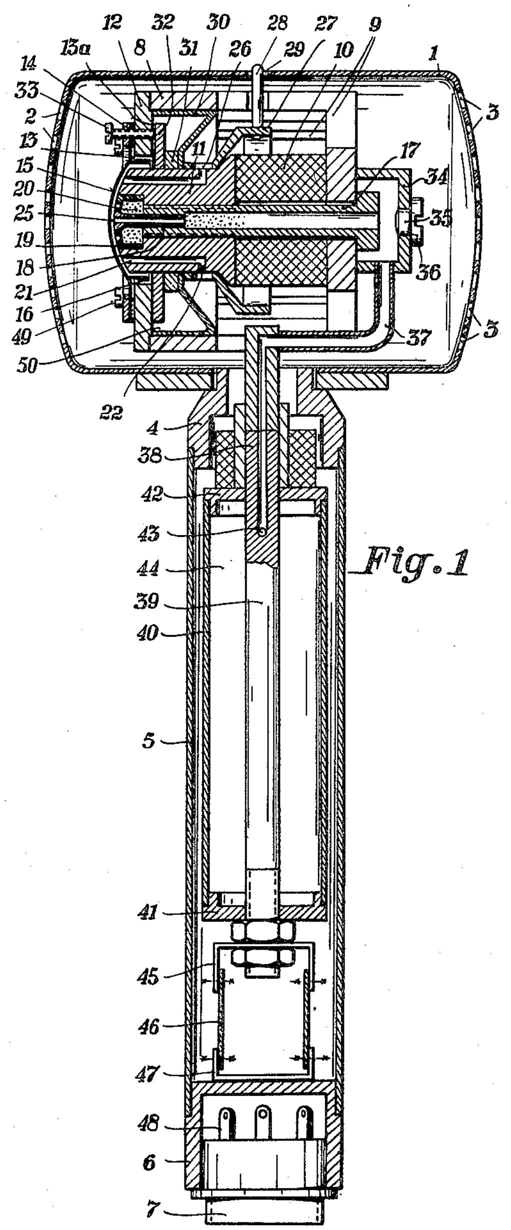

In Fig. 1, the numeral designates the protective casing of a microphone, which casing has apertures preferably on all sides, but at least at the two opposed sides, as at 2 and 3. The protective casing is fixed by means of an adapter 4 to a tube 5, which, through a stopper 6, is connected with the plug 7 for the microphone. The portective casing 1 accommodates the microphone casing proper, designated by the numeral 8, which is of pot shape and has apertured 9. At the middle of the pot-shaped casing 8, a cylindric permanent magnet 10 is fixed, and is adjourned by a cylindrical yoke 11 having a cambered cap projecting over the rim of casing 8. Casing 8 is closed by a pole plate 12, having an aperture through which the cambered end of yoke 11 projects, leaving an annular air gap 13. Pole plate 12 has fixed thereto, by means of a retaining ring 14, a diaphragm 15 with a rigid, dome-shaped central portion and a flexible rim. The moving coil 16 of diaphragm 15 enters the air gap 13. Yoke 11 and magnet 10 are connected to the bottom of casing 8 by a sleeve 17 passing through them. In the sleeve 17 a sleeve 18 is inserted, and the latter carries, at the end facing the diaphragm, a disk 19, which covers a bore 20 formed in yoke 11 at the end of the latter directed toward the diaphragm. That disk 19 is designed so as to contain an acoustic frictional resistance. Offset radially with respect to the axis of yoke 11 the latter is provided with axially directed ducts 21 having radially opening ends 22 remote from the diaphragm so that the air cushion 25 formed behind the diaphragm and defined on the one hand by the diaphragm and on the other hand by the cambered end of yoke 11 communicates through ducts 21 and 22 and the apertures in the protective casing 1 with the side of the sonic field remote from the diaphragm.

The ends or outlets of ducts 21 can be closed partly or entirely by a ring 26 rotatable on yoke 11 and connected through a bail 27 with an actuating lug 28 accessible through an aperture 29 of casing 1. Pole plate 12 is adjoined at its inside surface by the rim of a pot 30, which is disposed against the radially inner surface of the cylindric wall of casing 8 and tapers to the yoke 11, and which through a rubber washer 31 urges a ring disk 32 against pole plate 12.

The outer rim of ring disk 32 can be forced away from pole plate 12 by an adjusting screw 33 screwed through said plate so that the air space 50 formed by pot 30 communicates with air cushion 25 through the annular gap 13 and the air gap 13*a*. The width of the annular gap 13 can be adjusted by turning the screw 33. At its bottom the shaped casing pot 8 is adjoined by a pot 34, having a central aperture 35 which is closed by means of a screw 36 and a radial aperture which has a tube 37 stuck therein. The tube 37 communicates with a tube 38 mounted in the sleeve 5 and continued towards plug 7 as a bolt 39, which is connected at its lower end with a sleeve 40 arranged within sleeve 5 having end disks 41 and 42 through which the bolt 39 extends axially. Tube 38 opens through a radial bore 43 into an air chamber 44, which is defined by the sleeve 40 and bolt 39 and by the end disk 41 and 42 and which thus communicates with air cushion 25 through tube 37, pot 34, and sleeves 17 and 18.

Through connecting elements 45, 46, 47 the rod 39 is connected with the stopper 6, in which is mounted the plug 7 with sockets 48 for connecting the leads.

Figure 2:
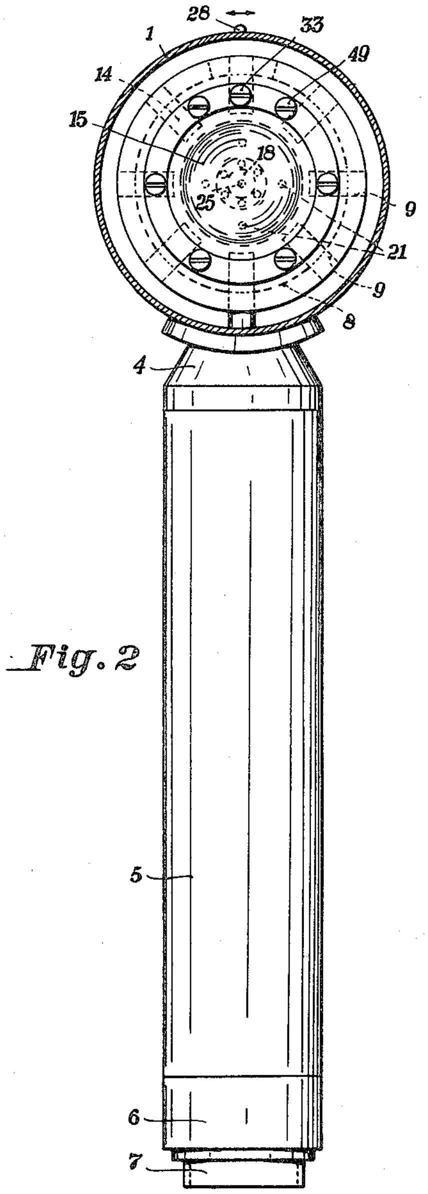
Fig. 2 is an elevation view of the microphone of Fig. 1.

Fig. 2 shows the distribution of ducts 21, the arrangement of fixing screws 49 of the retaining ring 14 for the diaphragm 15, and of the adjusting screw 33, with the front wall of the casing removed.

In the microphone construction shown the length of each duct 21, 22 is less than a quarter wavelength of the highest frequency to be transmitted so that standing waves and corresponding resonance phenomena are safely avoided in the air plugs enclosed in these ducts. The dimensions of these air plugs or ducts are obtained as follows: Let M designate the mass of the diaphragm, Q its surface area, and $v_M$ its velocity, and assume for the purpose of simplification that the diaphragm is plane and closes a low, correspondingly plane pressure space, from which $n$ ducts having the cross-sectional area $q$ and the length L lead to that part of the sonic field which is remote from the diaphragm. Further, let $v_L$ designate the particle velocity of the air molecules in the ducts, and assume that the vibration of the diaphragm and the action of the sonic field does not cause an air current in the duct, the air molecules in these ducts merely oscillating about a position of rest so, as for liquids, the continuity law applies, according to which in communicating spaces of different cross-sectional area the product of velocity (particle velocity) and cross-sectional area is constant.

This gives the relation:

$$v_L \times n \times q = v_M \times Q$$

According to a simplifying assumption the fluctuations of the air molecules in the ducts are transmitted without loss to the diaphragm.

With $\rho$ as the density of air, this gives $$\frac{nLq\rho v_L^2}{2} = \left(\frac{Q}{nq}\right)^2 \frac{nLq\rho v_M^2}{2}$$

Hence the transformer ratio is $$\left(\frac{Q}{qn}\right)^2$$

The air plugs thus increase the diaphragm mass M by an additional mass $$m = \rho L \frac{Q^2}{nq}$$

Further the natural frequency $f_M$ of the diaphragm having the mass M and, owing to the flexible rim, the stiffness D, is obtained in the manner known as $$f_M = \frac{1}{2\eta}\sqrt{\frac{D}{M}}$$

To increase the diaphragm mass by the mass of the air plugs so that a resonance point is obtained at the lower limit $f_t$ of the transmission range, it is necessary that $$f_t = \frac{1}{2\eta}\sqrt{\frac{D}{M+m}}$$

Hence the effective mass of the air plugs must be $$m = \left\{\left(\frac{f_M}{f_t}\right)^2 - 1\right\} M$$

For a lower limit of the transmission range at 50 C./S. and for resonance frequencies $f_M$ of 180 C./S., 200 C./S. and 250 C./S., the total mass of the air plugs must, in view of the above be 11.96 times, 15 times and 24 times, respectively, the diaphragm mass.

For ducts of constant total cross-sectional area the mass is constant and the frictional resistance increases with the number of ducts. For increasing the frictional resistance the ducts may depart from the circular shape.

When the known relation $$\lambda = \frac{v}{f}$$

for the wavelength $\lambda$, the particle velocity $v$ and the frequency $f$ is observed, the following relation results from the above formula:

$$L \leqq \frac{1}{4}\frac{v_L}{f_h} \text{ or } \frac{1}{2}\frac{v_L}{f_h}$$

$$q = \frac{Q^2 \times L \times \rho}{M \times n} \cdot \frac{1}{\left\{\left(\frac{f_M}{f_t}\right)^2 - 1\right\}}$$

The air enclosed in air chambers 44, 50 and 20 has a restoring force (stiffness) corresponding to the size of the respective chambers. Together with the mass of the diaphragm, the stiffness of its grip, the frictional resistance, and the mass of the air in the ducts leading to these spaces, leads to resonance points in the lower, medium and upper transmission ranges. The respective resistances cause the resonance curves of the several circuits to be flattened. This ensures the frequency-independent response of that part of the microphone which operates as a pressure microphone. To form a cardioid directional characteristic it is now necessary that the effect of the sound pressure component and the effect of the sound pressure gradient component be equal at the axis of the diaphragm and have the same signs in front of the diaphragm and opposite signs behind the diaphragm to extinguish each other completely at the latter point.

Since in a microphone having a casing diameter of 4 cm. and a sound detour of 5.5 cm. for the pressure gradient the amount of the latter in the lower frequency range is only about $\frac{1}{30}$ of the sound pressure, the friction in the ducts or apertures leading to the pressure spaces must be made correspondingly great in order to reduce the effect of the sound pressure on the diaphragm. Since as the frequency increases the pressure gradient is doubled with each octave, that increase of the pressure gradient must be offset by a corresponding mass restraint of the diaphragm.

That increase of the impedance is determined substantially by the relation of frictional resistance to mass, i. e. by the decrement, so that, for compensating the pressure gradient, the mass and the frictional resistance of the air plugs in the ducts 21 must have a most favorable value.

The frictional resistance of the air plug in ducts 17, 37, 38 for the pressure component is suitably formed by textile inserts therein.

For controlling the directional characteristic in operation, i. e. for varying the effect of the pressure gradient component compared with that of the pressure component on the diaphragm, the cross-sectional area of the air plugs can be altered by an adjustment of ring 26.

The uppermost limit of the outer diameter of the microphone (sound detour) is given by the highest transmission frequency $f_h$ and theoretically should be less than half its wavelength because diffraction phenomena results in the case of higher frequencies.

It has been found that a directional effect is obtained, even without co-action of a pressure gradient component, with the sound pressure component if the wavelength approaches the order of magnitude of the microphone diameter. With a diameter of 4 cm. the directional effect is obtained for a frequency of up to 6000 C./S. For this reason the directional effect for frequencies above that value is determined mainly by the sound pressure sensitive part of the system, because for frequencies above that value the impedance of the air plugs in the ducts 21, 22 becomes too high, owing to the mass of the plugs.

The arrangement of reflecting or absorbing surfaces or of Helmholtz resonators with corresponding apertures in front of the diaphragm makes it possible to further strongly influence the directional effect for higher frequencies. Then the diameter of the microphone casing may be larger than would be permissible if only the effect of the pressure gradient for the highest transmission frequency was considered.

Figure 3:
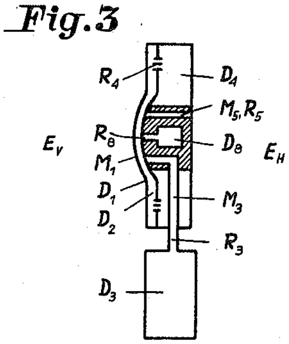
Figs. 3, 5, 7 and 9 are schematic representations of microphones according to the invention, while Figs. 4, 6, 8 and 10, respectively, show the corresponding electrical equivalent circuit diagrams.
Figure 4:
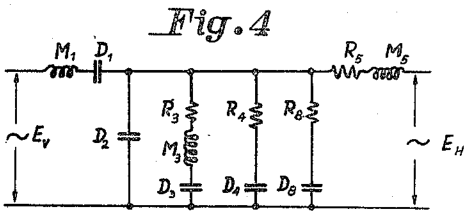

Fig. 3 shows in diagrammatic form the resonance circuits of the microphone according to Figs. 1 and 2, with the same indices being annexed to the reference letters used to identify the impedances belonging to each of the several circuits. In Fig. 3, M1 designates the mass of the diaphragm, D1 the stiffness of the gripping of its rim, and D2 the restoring force of the air cushion between diaphragm 15 and yoke 11 and pole plate 12. The air plugs enclosed in ducts 21, 22 are designated by the indication of their mass M5 and of their frictional resistance R5. The resistance (acoustic frictional resistance) formed by a fine screen which covers the apertures of disk 19 is indicated at R8, and the restoring force of the air in the air chamber 20 behind the disk 19 is indicated at D8. The resistance formed by the narrow gap between ring disk 32 and pole plate 12 is indicated at R4, and the restoring force of the air in the air chamber 50 is indicated at D4. The mass of the air plug enclosed in sleeves 17, 18, 37, 38 is designated by M3, its frictional resistance is indicated at R3, and the restoring force of the air chamber 44 communicating therewith is indicated at D3. Thus, the equivalent circuit diagram of Fig. 4 is obtained for consideration of the electromotive forces $E_v$, $E_h$ effective as equivalents of the particle velocities in the spaces before and behind the diaphragm, respectively. The several circuits are adjusted to form the following resonance points:

| Resonance Frequency in C./S. | Impedances with Indices | |
|---|---|---|
| | Pressure Microphone | Pressure Gradient Microphone |
| 50 | | 1 and 5. |
| 80 | 1 and 3 | |
| 200 | 1 (diaphragm without air cushion) | |
| 1,000 | 1 and 4 | |
| 3,000 | 1 and 8 | |
| 10,000 | 1 and 2 | |

Figure 5:
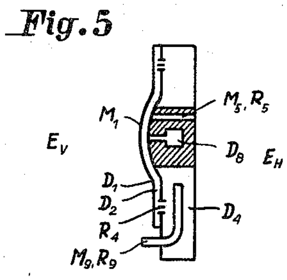
Figure 6:
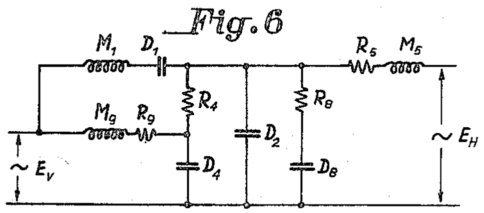

Using the same indices Fig. 5 represents a microphone whose pressure chamber D4 is connected on the Western principle through an air plug M9 with the front sonic field. Fig. 6 represents the equivalent electric circuit diagram corresponding to the microphone of Fig. 5. The distribution of the resonance points over the transmission range corresponds to that given for the microphone of Fig. 3, with the exception that the resonant circuit $R_3$, $M_3$, and $D_3$, is replaced by an air plug having the mass M9 and connecting the front sonic field with the pressure chamber having the restoring force D4. Thus the sonic vibrations of the front sonic field through these pressure chambers and the frictional resistance R4 also act on the rear side of the diaphragm. Then a resonance between the mass M9 of the air plug and the restoring force D4 is obtained at about 80 C./S in the lower transmission range. The sound vibrations in the pressure space, amplified owing to the resonance, are transmitted after a phase rotation through the frictional resistance R4 to the rear side of the diaphragm so that an additional amplitude of the diaphragm results.

Figure 7:
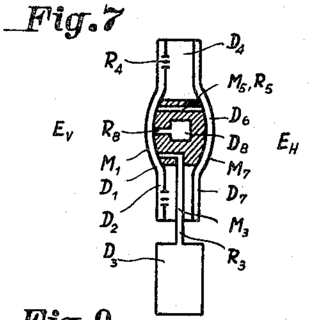
Figure 8:
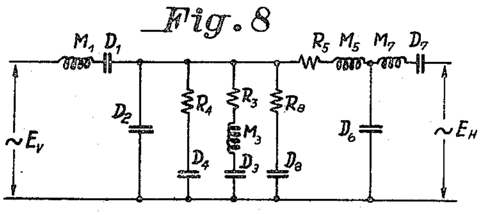

Fig. 7 shows a microphone which corresponds to that of Fig. 3, but which additionally has, at its rear side, another diaphragm having the mass M7 and a rim gripping with the stiffness D7. The air plug having the mass M5 and coupled with the diaphragm M1 is then influenced by the rear sonic field through that rear diaphragm rather than directly. The air cushion confined by the rear diaphragm is also low so that its restoring force D6 is relatively strong and practically does not constitute an effective shunt to the impedances of the air plug. The addition of the rear diaphragm provides, in addition to the circuit diagram of Fig. 4, a series impedance M7, D7 and a parallel impedance D6 (Fig. 8).

The resonant frequency of circuit M7, D7, D6 like that of circuit M1, D1, D2 is about 10000 C./S.

Frictional resistances similar to the frictional resistances R4, R8 may lead from chamber D6 to appertaining chambers.

Figure 9:
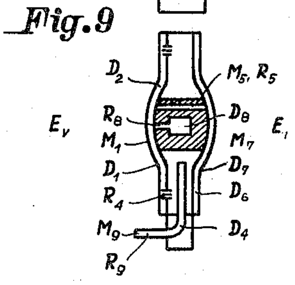
Figure 10:
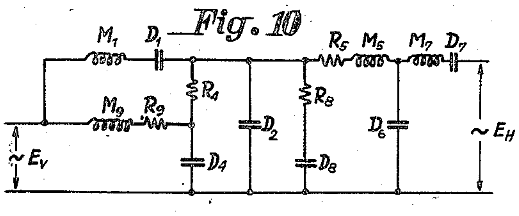

Fig. 9 shows a microphone which corresponds to that of Fig. 5 but which additionally has, at its rear, another diaphragm having the mass M7, a rim gripping with the stiffness D7, and behind it an air cushion with the restoring force D6. Fig. 10 again shows the equivalent electric circuit diagram. The remarks made above with respect to Figs. 7 and 8 apply here analogously.

Figure 11:
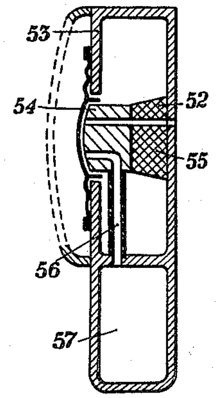
Figs. 11 to 17 are schematic representations illustrating the arrangement of magnets in the microphone casings which are shown in longitudinal section.

Fig. 11 shows a microphone casing to the bottom of which a permanent magnet 52 is fixed. The magnetic circuit is completed by a pole plate 53 and a yoke 54 and the air gap between them. In that case it is assumed that the duct 55 of the air plug for the pressure gradient leads directly to the rear of the microphone whereas a duct 56 leads to an air chamber 57 connected with the microphone casing.

Figure 12:
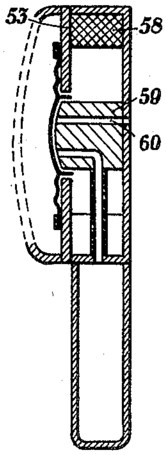

In the embodiment Fig. 12 part of the periphery of the microphone casing consists of permanent magnet sectors 58, the magnetic circuit of which is completed through the bottom of the casing, a boltlike yoke 59 attached thereto, and a pole plate 53. When a duct 60 is extended through the yoke 59 directly to the rear of the microphone this arrangement results in a very small length of the duct 60.

Figure 13:
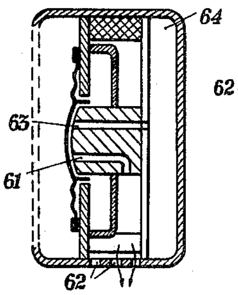
Figure 14:
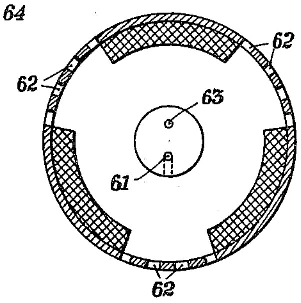

Fig. 13 shows a microphone also having magnet sectors arranged at its side walls. However, the side walls of the microphone casing in this embodiment have apertures 62, through which the air plug in duct 61 communicates with the rear of the microphone. Duct 63 leads to an air chamber 64, which corresponds to the pressure chamber 57 or 44. The arrangement of the permanent magnets of the microphone of Fig. 13 will be apparent in Fig. 14.

Figure 15:
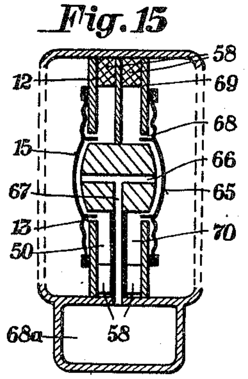

Fig. 15 shows a microphone with two diaphragms 15 and 65, defining flat air cushions which communicate with each other through a duct 66. Here again permanent magnet sectors 58 are arranged at the side walls of the microphone so that there is obtained a magnetic circuit corresponding to that described with reference to Figs. 12 and 13. The duct 67 communicating with the air cushions leads to an air chamber **68*a*. The flat air cushions behind the diaphragms communicate with air spaces 50 and 70, through air gaps 13 and 68 between pole plates 12 and 69**, respectively.

Figure 16:
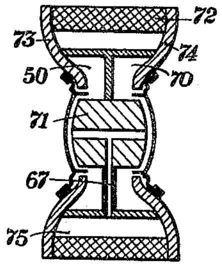

Fig. 16 shows a symmetrical microphone which is similar in construction to the microphone of Fig. 15, in that it also has two diaphragms, but in which the boltlike yoke 71 is shorter than the permanent magnet ring 72. The pole plates 73, 74 are outwardly curved correspondingly. With the microphone of Fig. 16, an even larger transmission range can be received than with the microphone according to Fig. 15 when the magnetic conditions in the air gaps between yoke 71 and the pole plates are equal in other respects. The air chambers 50 and 70 of Fig. 16 correspond to the air chambers identified by the same reference numerals in Fig. 15. On the other hand the air chamber 75, into which the duct 67 opens, is arranged within the permanent magnet ring 72.

Figure 17:
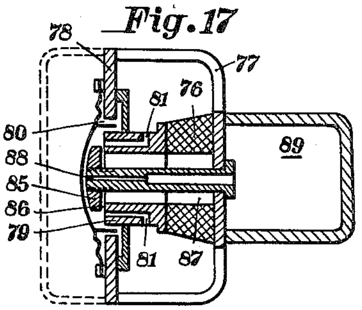

Fig. 17 shows a microphone casing with an internal arrangement in which a permanent ring magnet 76 serves to generate the magnetic field for the moving coil in the air gap 80 by means of an apertured pot 77, the pole plate 78 and the hollow cylindrical yoke 79. The ducts 81 (which form the air plugs M5, R5) are effective for the pressure gradient. Such ducts 81 permit the sound to pass into the open at the rear side of the diaphragm through the apertures of pot 77. The air gap 86, formed by the cap 85 opposite to the yoke 79, the air chamber 87 and the air plug 88 with the air chamber 89 are effective for the pressure component.

Figure 18:
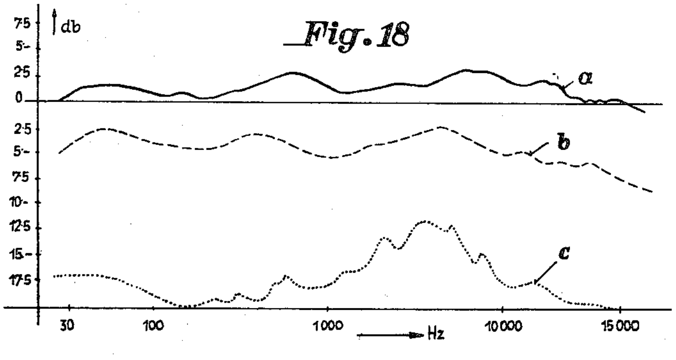
Fig. 18 shows the frequency esponse curves obtained with a microphone according to the invention.

Fig. 18 represents the frequency response curves obtained for different directions of incidence with a microphone according to the invention. Curve *a* was obtained at an angle of incidence of 0 deg., curve *b* at 90 deg. and curve *c* at 180 deg.

Figs. 1 to 17 show only dynamic microphones which have one or several bores in the yoke (bolt) of the magnet system. It has been found that the linearity of the frequency response curve may be disturbed by effects occurring because the moving coil of the diaphragm separates the low air chamber disposed behind the diaphragm into two flat air cushions, which are interconnected acoustically only by way of the detour around the moving coil. When the diaphragm is moved by the sound pressure on the outside, the air from the annular air chamber disposed outside the moving coil must flow around the moving coil into the low air chamber situated behind the cambered central portion of the diaphragm, and thereafter such air passes into the open through the bores in the yoke of the magnet system at the rear of the diaphragm.

In order to avoid such disturbance of the linearity of the frequency response curve, other embodiments of the invention have ducts leading from the low air chamber disposed behind the cambered central portion of the diaphragm through the yoke, and ducts which lead into the open from the low air chamber behind the annular margin of the diaphragm, the length of the last mentioned ducts being at most half, preferably one quarter of the wavelength of the maximum transmission frequency to be utilized. In some cases it has been found suitable to provide for the escape of air from the entire low air chamber disposed behind the diaphragm through bores or ducts opening into the low air chamber disposed outside the moving coil rather than through the yoke.

Figure 19:
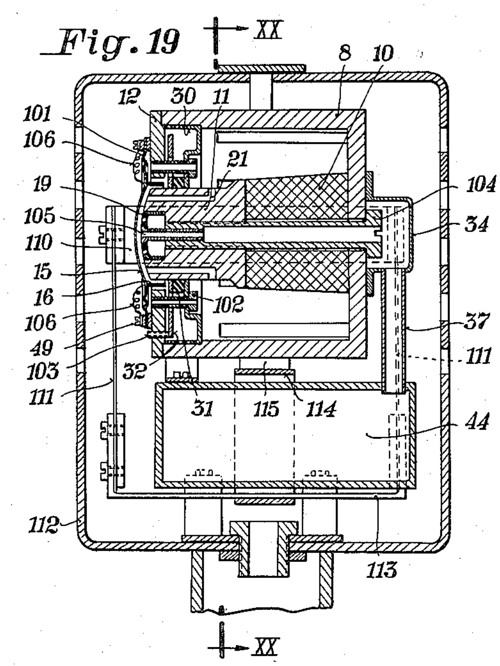
Fig. 19 is a fragmentary, longitudinal sectional view of a microphone according to still another embodiment of the invention.
Figure 20:
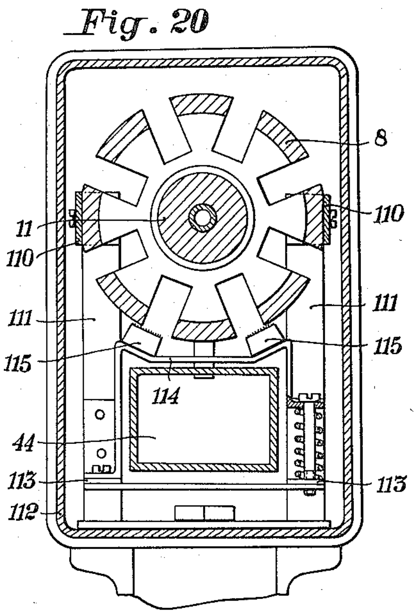
Fig. 20 is a sectional view taken along the line XX—XX of Fig. 19.

Figs. 19 and 20 illustrate an embodiment of such dynamic microphone. The numeral 15 designates the diaphragm having a cambered central portion 101 and a moving coil 16. The diaphragm 15 is gripped by a retaining ring which is secured by screws 49. The microphone casing proper, designated by the numeral 8, is of pot shape and closed by a pole plate 12. In the center of the casing 8 a permanent magnet 10 is disposed, and a cylindrical magnet yoke 11 forms a continuation of the permanent magnet. The yoke 11 has two to four bores 21, which are 0.8–1.4 mm. in diameter, and through which air can flow into the open from the low air chamber disposed outside the moving coil 16 only by way of a detour around the moving coil 16. According to the invention a second path for the escape of air out of the low air chamber disposed outside the moving coil is provided by two to four hollow screws 102 having bores 0.8–1.4 mm. in diameter. In order to form an air chamber the pot 30 is urged against the pole plate 12, with a rubber pad 31 and an adjusting disk 32, which provides an acoustic frictional resistance, being interposed between the pot 30 and pole plate 12. The air gap between the adjusting disk 32 and the pole plate 12 is adjustable by means of a screw 103. The pot-shaped microphone casing 8 is closed by a cap 34 having a tube 37 inserted therein and opening into an air chamber 44. A central screw 104, which is formed of non-magnetic material and has a longitudinal bore, is disposed within the magnet yoke 11. Another small central screw 105, formed with a bore about 1 mm. in diameter and 12 mm. long, is screwed into the screw 104 and holds an apertured cap 19, to form an air chamber filled with damping material. Connection leads 106 extend to the moving coil.

Figure 21:
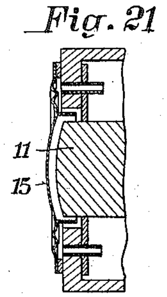
Figure 22:
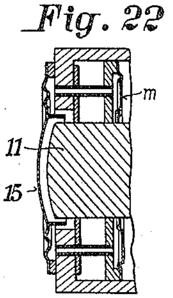
Figure 23:
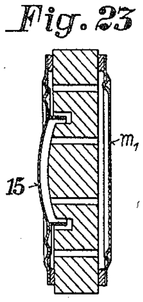

Figs. 21 to 23 are diagrammatic illustrations of additional embodiments. Fig. 21 shows an arrangement with a yoke 11 having no ducts. Fig. 22 corresponds to the arrangement of Fig. 21, but with an additional annular diaphragm *m*. Fig. 23 shows an arrangement similar to that of Fig. 19, but with an additional diaphragm $m_1$. The additional diaphragms *m* and *m*, may lead to an improvement in the frequency response curve, in certain cases.

Figure 24:
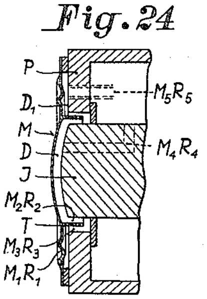

For a detailed explanation of the acoustical effects, the elements which are most significant with respect to the acoustical effects are shown in Fig. 24. The diaphragm with a cambered central portion and an annular margin $M_1$ has disposed behind it the air chambers D and $D_1$. The moving coil T forms, with the yoke J, an air gap having the acoustic mass $M_2$ and the friction resistance $R_2$, while the moving coil T forms, with the magnet plate P, an air gap having the acoustic mass $M_3$ and the friction resistance $R_3$. A bore indicated with dash lines in yoke J contains an acoustic mass $M_4$ and a friction resistance $R_4$. In the magnet plate P there is provided a sleeve, shown with dash lines, which has the acoustic mass $M_5$ and the friction resistance $R_5$. Several bores or sleeves may be arranged in parallel in place of the single bore shown in the yoke J and in place of the single sleeve shown in the plate P, respectively. By the selection of the number and dimensions of the ducts defined by the above mentioned bores and sleeves, the acoustic effects can be influenced to a high degree. The ducts may differ in length; but, in that case, it is necessary that their cross sections be such as to provide for an equal mass transformed. The calculations previously given with respect to the microphone of Figs. 1 and 2 apply analogously to the microphones now being considered. Depending on the size ratio between the cambered central portion and the margin of the diaphragm, optimum relative sizes will be obtained which completely eliminate any air flow around the moving coil.

Figure 25:
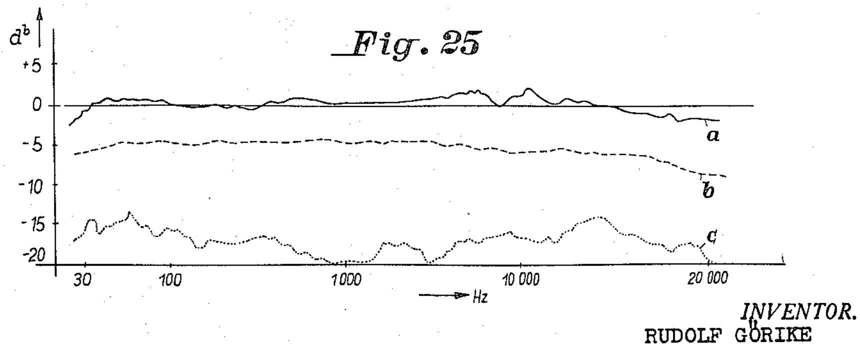

Fig. 25 shows frequency response curves which can be achieved by applying the foregoing teachings. The frequency curve *a* was obtained at an angle of incidence of 0 deg., curve *b* at 90 deg. and curve *c* at 180 deg.

Figs. 19 and 20 further show a particularly suitable resilient suspension for the microphone. The part carrying the elements most essential for the function desired operation of the microphone, particularly the diaphragm, is resiliently suspended by springs 111. The microphone casing 8 has affixed thereto two strips 110, each of which is laterally bent at both ends and provided, at each of said ends, with a leaf spring 111. The other ends of the four leaf springs 111 are fixably secured to brackets 113 arranged in the protective casing 112 of the microphone so that the latter is held only by the four leaf springs 111. Moreover, the brackets 113 each have arranged thereon a resilient bail 114, which carries damping elements 115 for the microphone casing 8. The above described mounting is dimensioned so that the natural frequency of the system comprising the springs 111 and the parts carried thereby is below the limits of the transmission frequency utilized. The described mounting ensures a considerable freedom of the microphone from shock.

In order to obtain different directional characteristics, two or more cardioid microphones according to the invention may be connected together. Particularly when two microphones according to the invention with cardioid characteristics and oppositely directed maximum responses are connected together, all directional characteristics, such as nondiscriminative, cardioid, and bidirectional characteristics, as well as all intermediate positions, can be obtained by means of electric circuit elements. When the two microphones are connected so that their output voltages are in phase, a nondirectional characteristic is obtained. Phase opposition provided by reversing the poles of one microphone gives the bidirectional characteristic. When only one microphone is electrically connected is the cardioid characteristic obtained. By reducing the output voltage either in steps or continuously, the intermediate positions can be obtained. The adjustment also may be effected by remote control. Although illustrative embodiments of the invention have been described in detail herein with reference to the accompanying drawings, it is to be noted that the invention is not limited to those precise embodiments, and that various changes and modifications may be effected therein without departing from the scope or spirit of the invention, except as defined in the appended claims.

I claim:

1. A dynamic microphone for transmitting a predetermined frequency range and responsive to front and rear sound fields; said microphone comprising, in combination, a vibrating system including a diaphragm exposed to the front sound field, means including the rear side of said diaphragm defining an air cushion, means defining at least two air spaces shielded from direct exposure to both said sound fields, means defining at least one duct of low frictional resistance which opens at one end directly into said air cushion and contains an air plug exposed to the rear sound field, said air spaces and said air plug in its entire length communicating with said air cushion and said air plug coupled only by said air cushion to the diaphragm, said air spaces constituting acoustic impedances different from each other, which together with the vibrating system provide resonance at frequencies distributed over said range, the length of said air plug is less than half the wavelength of the highest frequency of said range, the total air plug mass effective at the diaphragm together with said vibrating system forming an acoustic resonant circuit having a resonant frequency at least 100 C. S. below the natural frequency of said vibrating system.

2. A microphone as set forth in claim 1; wherein said means defining the air spaces includes a casing carrying said vibrating system, said casing having a front aperture covered by said vibrating system, a peripheral aperture, and at least one rear aperture exposing the rear end of said air plug to the rear sound field; and wherein said means defining the air cushion and the duct include a bolt contained in said casing and having a cylindrical portion formed at its periphery with an opening at the rear end of said duct; said microphone further comprising a ring rotatably mounted on said cylindrical portion and havnig an aperture adapted to register with said rear end opening of the duct and means operatively connected to said ring and extending out through said peripheral aperture and movable therein so as to vary the register of the aperture of the ring with said rear opening by rotating said ring whereby the directional characteristic of the microphone is varied from cardioid when said aperture of the ring is in full register with said rear opening to omnidirectional when said aperture of the ring is out of register with said rear opening.

3. A microphone as set forth in claim 1; wherein one of said air spaces includes a pressure chamber and an air plug coupling said pressure chamber through said air cushion to said diaphragm, and the restoring force of said pressure chamber and the mass and friction of said air plug form together, with said vibrating system, an acoustic circuit having resonance between the lower limit of said frequency range and the natural frequency of said vibrating system.

4. A microphone as set forth in claim 1; wherein one of said air spaces includes a pressure chamber and an air gap connecting said pressure chamber to said air cushion and constituting a frictional resistance, and an air plug communicates said pressure chamber with the outside air, the frictional resistance of said gap, the mass and friction of said air plug, and the restoring force of the air in said pressure chamber forming together, with said vibrating system, an acoustic circuit having resonance between the lower limit of said frequency range and the natural frequency of said vibrating system.

5. A microphone as set forth in claim 1; wherein said means defining the air spaces includes a casing carrying said vibrating system and having a front aperture covered by said vibrating system; said casing containing at least one of said air spaces as well as said means defining said air cushion and said means defining said duct; said microphone further comprising frictional resistance means adjustably inserted in said one air space; said casing further having a rear aperture exposing the rear end of said air plug to the rear sound field; and wherein said microphone further comprises adjusting means operatively connected to said frictional resistance means and extending out of the casing and operable to vary the frictional resistance of said one air space by adjusting said frictional resistance means.

6. A microphone as set forth in claim 5; wherein said casing includes a front end portion formed with said front aperture and with a threaded bore and adjoining said one air space; said means defining said air cushion and said duct include a bolt contained in said casing and extending through said front aperture to define with said front end portion a peripheral air gap connecting said air cushion to said one air space; said frictional resistance means includes an annular plate slidably mounted on said bolt and extending in said one air space, and means resiliently urging said annular plate in said air space towards said front end portion; and said adjusting means includes a screw threaded from the outside of the casing through said threaded bore and engaging said annular plate to space it from said front end portion so that a radial gap is defined between said front end portion and said annular plate connecting said peripheral gap to said one air space, said screw being operable to vary the width of said radial gap.

7. A microphone as set forth in claim 1; wherein said means defining the air spaces includes a casing having a shell and a front end portion which carries said vibrating system and has an aperture covered by said system; and said means defining said air cushion and said duct include a bolt contained in said casing, said bolt being formed in its periphery with an opening at the rear end of said duct and said casing having at least one rear aperture exposing the rear end of said air plug to the rear sound field, said means defining the air spaces further including an annular unapertured partition the inner periphery of which embraces the periphery of said bolt between said air cushion and said rear end opening of the duct and which, together with said shell and front end portion, defines an air space surrounding said bolt.

8. A microphone as set forth in claim 1; wherein said diaphragm has a cambered central portion and an annular margin and carries a moving coil arranged between said central portion and said margin to divide said flat air cushion into a central chamber behind said cambered central portion and an outer chamber behind the annular margin; and wherein said means defining said air cushion and said ducts include a bolt defining said ducts, which opens into said central chamber of the air cushion, and additional means defining at least one duct of low frictional resistance which opens at one end into said outer chamber and contains an air plug directly exposed to the rear sound field and firmly coupled by said air cushion to said diaphragm, the length of said air plug in the last mentioned duct being also less than half the wavelength of the highest frequency of said range.

9. A microphone as set forth in claim 1; wherein said diaphragm has a cambered central portion and an annular margin and carries a moving coil arranged between said central portion and said margin to divide said flat air cushion into a central chamber behind said cambered central portion and an outer chamber behind the annular margin; and wherein at least one of said ducts of low frictional resistance opens at one end into said outer chamber.

10. A microphone as set forth in claim 1; further comprising a microphone casing carrying said vibrating system and being formed with strips, a protective casing accommodating said microphone casing and formed with brackets, and leaf springs each of which engages, at one end, a related one of said strips, and, at the other end, a related one of said brackets, said springs being dimensioned to have, in conjunction with the microphone casing, a natural frequency which is below said frequency range.

References Cited in the file of this patent

UNITED STATES PATENTS

| | | |
|---|---|---|
| 2,086,649 | Thuras | July 13, 1937 |
| 2,104,433 | Marshall | Jan. 4, 1938 |
| 2,126,566 | Marshall | Aug. 9, 1938 |
| 2,216,961 | Sanial | Oct. 8, 1940 |
| 2,252,846 | Giannini et al. | Aug. 19, 1941 |
| 2,549,963 | De Boer et al. | Apr. 24, 1951 |